July 3, 1956  H. G. NEWBOULT  2,752,932
MAGNETICALLY-OPERATED CONTROL DEVICE
Filed June 12, 1951  2 Sheets-Sheet 1

Inventor
HENRY GRATTAN NEWBOULT,
By Robert B Larson
Attorney

July 3, 1956
H. G. NEWBOULT
2,752,932
MAGNETICALLY-OPERATED CONTROL DEVICE
Filed June 12, 1951
2 Sheets-Sheet 2
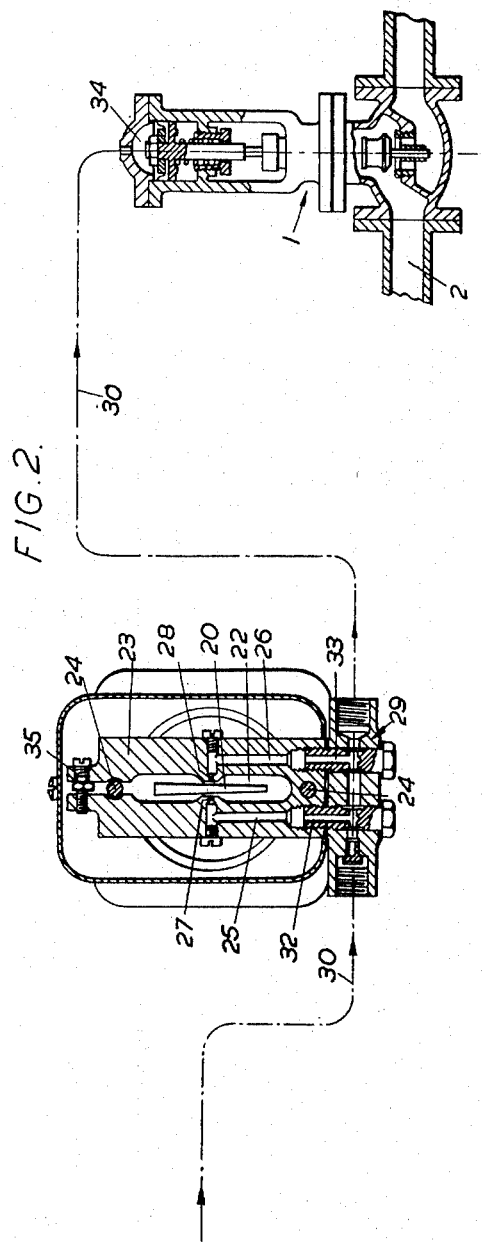
Inventor
HENRY GRATTAN NEWBOULT,
By Robert B Larson
Attorney United States Patent Office 2,752,932
Patented July 3, 1956

2,752,932
MAGNETICALLY-OPERATED CONTROL DEVICE

Henry G. Newboult, Slough, England, assignor to Ronald Trist & Co. Limited, Slough, England Application June 12, 1951, Serial No. 231,159

Claims priority, application Great Britain June 15, 1950

2 Claims. (Cl. 137—82)

Magnetic devices can be used with advantage for transmitting energy from one side of a wall of a vessel or the like to the other. There are various possible arrangements, all dependent on one magnet being a driving magnet mounted on one side of the wall so that one pole can move in a path adjacent to that in which one pole of the other or driven magnet can move, the driven magnet moving as a result of either attraction or repulsion when the driving magnet moves. The devices most usually employed depend upon magnetic repulsion, and the driven magnet moves with snap action and may be made to open and close electric contacts. The present invention is solely concerned with devices depending upon the magnetic attraction of unlike poles.

It is an object of the present invention to provide apparatus embodying such magnetic transmission and adapted to apply progressive control to the pressure of fluid in a chamber.

It is a further object to provide such apparatus comprising a valve with a valve member which by simple rocking progressively obstructs the flow of fluid to or from the chamber.

Further objects and advantages will appear from the accompanying drawings and following description of one embodiment of the invention.

In the drawings:

Figure 2 is a section on the line II—II in Figure 1 and also shows on a smaller scale a valve controlled by the device.

Figure 1:
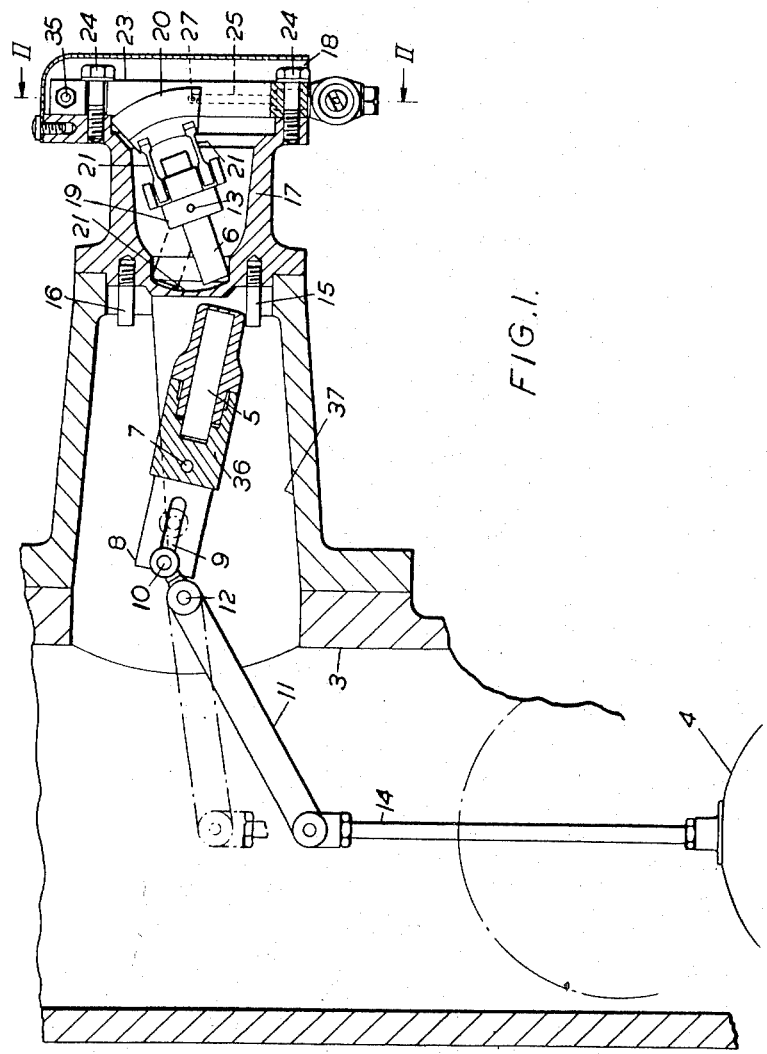
Figure 1 is a vertical section through the magnetically operated device.

The device shown serves to control a piston-operated valve 1 in a pipe line 2 through which feed water is supplied to a boiler, the device being arranged partly inside and partly outside a float chamber 3 in which a float 4 rises and falls in accordance with the water level in the boiler. The device comprises two bar magnets 5 and 6 mounted one on each side of a wall of an extension 37 of the float chamber 3, the magnet 5 being held in a carrier 36 mounted to rock about a pin 7 extending horizontally across the extension 37 of the chamber. The carrier 36 has a tail 8 with an open-ended slot 9 which receives a pin 10 carried by the end of a lever 11. This lever is pivoted at 12 about another horizontal pin and its other end is pivotally linked to the top of a stem 14 which extends up from the float 4. As the float rises, therefore, the magnet 5 is caused to rock anti-clockwise and vice versa. Its rocking motion is limited by stops 15 and 16.

The magnet 6 is mounted in a housing 17 secured to the extension 37 of the float chamber 3 and open to the atmosphere at 18. The magnet 6 is held in a carrier 19 mounted to rock about a horizontal pin 13, and its end nearer the magnet 5 moves in a recess 21 in the wall of the housing 17 between stops constituted by the wall of the recess and is close to the end of the magnet 5. The polar arrangement is such that the magnets attract one another, and in consequence the magnet 6 follows all the movements of the magnet 5 but, of course, rocks in the opposite direction of rotation.

The magnet 6 and its carrier 19 form, it will be seen, a bar-like member, the second end of which is constituted by a tapered vane 20 carried by two blade springs 21 fixed to the carrier 19. This vane 20 moves in an open-ended slot 22 in a wall 23 in the housing 17, this wall being secured to the body of the housing by screws 24. The slot is contracted at its mid-point to form a waist in which the vane moves with very small clearance.

The wall 23 is formed with two passages 25 and 26 which terminate in openings 27 and 28 in the waist of the slot, one on each side of the vane 20. On the underside of the wall 23 there is a fitting 29 in an air-supply line 30 which leads from a source of compressed air to the valve 1. In the fitting 29 there are two transverse air passages 32 and 33 leading respectively to the passages 25 and 26.

Alteration in the extent to which the valve 1 closes depends upon the pressure in a pressure chamber 34 formed within it. In turn the pressure in the chamber 34 depends on the extent to which air can bleed out of the fitting 29 through the passages 25 and 26. In turn this depends on the extent to which the vane 20 obstructs the openings 27 and 28, or allows air to flow freely through them into the slot 22 and so to the atmosphere. From what has been said above it will be appreciated that the degree of obstruction of the openings 27 and 28 depends upon the angular position of the magnet 6 and therefore on the height of the float 4.

The position of the openings 27 and 28 in relation to the vane 20 needs very careful adjustment. Accordingly the wall 23 is made of somewhat resilient metal and at its upper end there is an adjusting device in the form of a screw 35 by which the two arms can be forced together or spread apart.

In the device illustrated it will be seen that the magnets are mounted about parallel axes with unlike poles facing one another and moving through paths which converge and then diverge again. The magnets may, however, be arranged in other ways. Thus they may extend radially from shafts having a common axis, the magnets being arranged parallel to the wall which separates them, instead of perpendicular to it. Again, on each side of the wall two or more magnets may be mounted parallel to but spaced away radially from a shaft, the two shafts having a common axis, so that there is an assembly of driving magnets having poles each moving in a part-circular path around the shaft and a similar driven assembly composed of magnets each co-operating with one of the poles of the driving assembly.

Yet again, the driving magnet may move in a straight line which is substantially tangential to the path taken by the driven magnet. For instance, the driving magnet may be carried by the stem of a float mounted to rise and fall vertically. With this arrangement there may be more than one driven magnet cooperating with the driving magnet, the driven magnets being mounted one above another so that the driving magnet in rising or falling acts first on one and then on another. Of course, the rocking movement of each driven magnet must then be limited by stops.

I claim:

1. Transmission mechanism for translating progressive movement imparted to a driving element into progressive corresponding variations in pressure in a pressure chamber, said mechanism comprising, a driving magnet adapted to be moved progressively by said driving element, a driven magnet mounted for movement in a path adjacent to but spaced from the path of movement of said driving magnet, the adjacent ends of said magnets being of opposite polarity, a conduit defining the path of fluid to the pressure chamber, a member mounted on said driven magnet for simple rocking motion for progressive movement into and out of positions in which it varies the pressure of fluid under pressure in a path leading to said pressure chamber, said member comprising a vane which rocks between two opposed elements in which are ports, said ports being connected at spaced points to said conduit, said vane being tapered in cross-section so that in one extreme position the portions of its faces opposite said ports are very close thereto to close said ports whereby pressure of fluid to said pressure chamber through said conduit is at a maximum, while in the other extreme position a substantial clearance is formed between said faces and said ports to open said ports whereby pressure of fluid to said pressure chamber through said conduit is at a minimum, means mounting said opposed elements for slight rocking movement relative to each other to vary the separation of said ports so as to vary the maximum and minimum pressure values.

2. Mechanism as defined in claim 1, said last-named means comprising an adjusting screw for moving said opposed elements laterally.

References Cited in the file of this patent

UNITED STATES PATENTS

| | | |
|---|---|---|
| 1,894,367 | Corcoran | Jan. 17, 1933 |
| 2,170,418 | Mabey | Aug. 22, 1939 |
| 2,231,158 | Davis | Feb. 11, 1941 |
| 2,330,654 | Ziebolz | Sept. 28, 1943 |
| 2,397,448 | Todd | Mar. 26, 1946 |
| 2,533,491 | McMahon | Dec. 12, 1950 |
| 2,670,464 | Wuensch et al. | Feb. 23, 1954 |

FOREIGN PATENTS

| | | |
|---|---|---|
| 390,550 | Germany | Feb. 20, 1924 |